(12) United States Patent
Bauman et al.

(10) Patent No.: US 7,730,197 B2
(45) Date of Patent: Jun. 1, 2010

(54) SERVER-BASED ACQUISITION AND USAGE OF DYNAMIC MAC ADDRESSES IN A VIRTUALIZED ETHERNET ENVIRONMENT

(75) Inventors: Ellen M. Bauman, Rochester, MN (US); Timothy J. Schimke, Stewartville, MN (US); Lee A. Sendelbach, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 917 days.

(21) Appl. No.: 11/427,805

(22) Filed: Jun. 30, 2006

(65) Prior Publication Data

US 2008/0005329 A1 Jan. 3, 2008

(51) Int. Cl.
*G06F 15/16* (2006.01)
(52) U.S. Cl. ............... 709/230; 709/226; 709/236; 709/245
(58) Field of Classification Search ............ 709/230, 709/226, 236
See application file for complete search history.

(56) References Cited

U.S. PATENT DOCUMENTS

| | | | | |
|---|---|---|---|---|
| 6,115,545 | A * | 9/2000 | Mellquist | 709/220 |
| 7,415,535 | B1 * | 8/2008 | Kuik et al. | 709/245 |
| 7,478,173 | B1 * | 1/2009 | Delco | 709/250 |
| 2005/0169284 | A1 * | 8/2005 | Natarajan | 370/401 |
| 2007/0073882 | A1 * | 3/2007 | Brown et al. | 709/226 |
| 2007/0162594 | A1 * | 7/2007 | Henry et al. | 709/224 |

\* cited by examiner

*Primary Examiner*—John Follansbee
*Assistant Examiner*—Nghi V Tran
(74) *Attorney, Agent, or Firm*—Patterson & Sheridan, LLP; James R. Nock

(57) ABSTRACT

Methods and systems for dynamically acquiring MAC addresses in a virtualized Network environment. A server may be partitioned into a plurality of logical partition. Each logical partition may be associated with a logical adapter to provide network access to the partition. A MAC address may be dynamically allocated to a logical adapter from a predefined range of MAC addresses. Furthermore, the MAC addresses may be unique within a particular subnet, therefore the same MAC address may be assigned to adapters in different subnets.

3 Claims, 6 Drawing Sheets

FIG. 3

| # OF ADAPTERS | # OF LOGICAL PARTITIONS PER ADAPTER | # OF LOGICAL PARTITIONS PER SUBNET | # OF MAC ADDRESSES (PRIOR SOLUTION) | # OF MAC ADDRESSES (THIS SOLUTION) | REDUCTION |
|---|---|---|---|---|---|
| 10,000 | 256 | 100,000 | 2,560,000 | 110,000 | 95.7% |
| 50,000 | 256 | 100,000 | 12,800,000 | 150,000 | 98.8% |
| 10,000 | 1024 | 100,000 | 10,240,000 | 110,000 | 98.9% |
| 50,000 | 1024 | 500,000 | 51,200,000 | 550,000 | 98.9% |

FIG. 4

| ADAPTERS | HASHING SCHEME |
|---|---|
| ADAPTER A | 1, 2, 3, … 10 |
| ADAPTER B | 10, 9, 8, … 1 |
| ADAPTER C | 5, 4, 3, 2, 1, 10, 9, 8, 7, 6 |

SERVER-BASED ACQUISITION AND USAGE OF DYNAMIC MAC ADDRESSES IN A VIRTUALIZED ETHERNET ENVIRONMENT

CROSS-REFERENCE TO RELATED APPLICATIONS

This application is related to U.S. patent application Ser. No. 11/427,799, entitled SERVER-BASED ACQUISITION, DISTRIBUTED ACQUISITION AND USAGE OF DYNAMIC MAC ADDRESSES IN A VIRTUALIZED ETHERNET ENVIRONMENT, filed on Jun. 30, 2006. This related patent application is herein incorporated by reference in its entirety.

BACKGROUND OF THE INVENTION

1. Field of the Invention

The present invention generally relates to data communication over a network, and more specifically to the use of dynamic Media Access Control (MAC) addresses in a virtualized Ethernet environment.

2. Description of the Related Art

As businesses grow and diversify the types of services offered to their respective customers, the number of servers and applications required to service customers also increases. Traditionally, each server box provided a single service. Therefore, growth in the number of services meant an increase in the number of servers required to provide the services.

With the emergence of server partitioning, a single server can be made to run as if it were two or more servers. Server partitioning offers a number of advantages to information technology (IT) departments of growing businesses. For example, system administrators can consolidate multiple applications into a single server box, thereby centralizing management, saving space, and potentially lowering IT costs.

As virtualization and server partitioning become increasingly common, the level of virtualization, i.e., the number of logical systems concurrently executing in each server, will continue to increase. Each logical partition typically requires its own network connection. A network connection is typically established through a network interface device, for example, a network interface card (NIC) or network adapter. However, providing each partition with its own Ethernet adapter can be very expensive because of the cost of network adapter cards. Furthermore, Input/Output (IO) enclosures required to house the adapters may take valuable space on the server.

One solution is to develop a virtualized Ethernet adapter which is capable of supporting a plurality of partitions. A single virtualized Ethernet adapter may provide a plurality of virtual (logical) adapters and each partition may use one of the logical adapters. Each logical adapter requires a unique Media Access Control (MAC) address. Traditionally, Ethernet adapters had MAC addresses permanently burned into the adapter, providing a unique MAC address for each physical port of the adapter. The virtualized Ethernet adapter requires a unique (MAC) address for each logical adapter in use. However, the actual number of MAC addresses required may not be known because the number of partitions of the server may dynamically change over time.

Prior art solutions for providing MAC addresses to logical adapters include allocating a sufficient number of MAC addresses to each virtualized Ethernet adapter to support the maximum number of logical partitions which may be serviced by the adapter. Each MAC address must be purchased from the Institute of Electrical and Electronics Engineers (IEEE). One problem with the prior art is that many of the MAC addresses will remain unused because most servers employ far fewer partitions than the maximum number of partitions supported. As the number of partitions supported by servers grows from tens to hundreds to thousands of partitions per server, the cost of acquiring MAC addresses for each partition will become prohibitive.

Another prior art solution is to employ user-defined MAC addresses instead of unique MAC addresses provided by IEEE. The advantage of this approach is that any number of partitions can be supported by the virtualized Ethernet adapter. However, there are significant drawbacks to this approach. For example, because the user defined MAC addresses are not unique, one or more adapters may be allocated the same MAC addresses, resulting in network failures. Furthermore, the virtualized Ethernet adapter must be manually configured prior to usage to ensure uniqueness of the MAC addresses, thereby making network communication slower and inefficient. Moreover, an experienced network administrator may be required to perform such complex configuration, thereby increasing IT costs.

Accordingly, what is needed are methods, systems, and articles of manufacture for acquiring MAC addresses in a virtualized Ethernet environment.

SUMMARY OF THE INVENTION

The present invention generally provides methods, systems, and computer readable storage media for dynamically allocating MAC addresses in a virtualized Ethernet environment.

One embodiment of the invention provides a method for dynamically acquiring Media Access Control (MAC) addresses by a virtualized network adapter. The method generally comprises sending a multicast message requesting MAC address allocation from the virtualized network adapter to one or more central MAC address servers, wherein the one or more central MAC address servers are within a subnet containing the virtualized network adapter, and allocating, by the one or more central MAC address servers, a MAC address from a predefined range of addresses for use by a logical adapter associated with the virtualized network adapter.

Another embodiment of the invention provides a computer readable storage medium containing a program for dynamically acquiring a MAC address for a virtualized network adapter which, when executed, performs an operation generally comprising sending a multicast message requesting MAC address allocation from the virtualized network adapter to one or more central MAC address servers, wherein the one or more central MAC address servers are within a subnet containing the virtualized network adapter, and allocating, by the one or more central MAC address servers, a MAC address from a predefined range of addresses for use by a logical adapter associated with the virtualized network adapter.

Yet another embodiment of the invention provides a system generally comprising a plurality of computers and one or more central MAC address servers connected to a network, one or more of the computers comprising at least one virtualized network adapter, wherein, to dynamically acquire a MAC address for one of one or more logical adapters associated with the virtualized network adapter, the virtualized network adapter is configured to send a multicast message to one or more central MAC address servers requesting MAC address allocation, wherein the one or more central MAC address servers are within a subnet containing the virtualized network adapter, and the one or more central MAC address servers are configured to allocate a MAC address from a predefined range of addresses for use by the logical adapter associated with the virtualized network adapter.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 3 is a table comparing the MAC addresses required by embodiments of the invention and the prior art.

FIG. 4 is an illustration of an exemplary hashing scheme according to an embodiment of the invention.

DETAILED DESCRIPTION OF THE PREFERRED EMBODIMENTS

Figure 1:
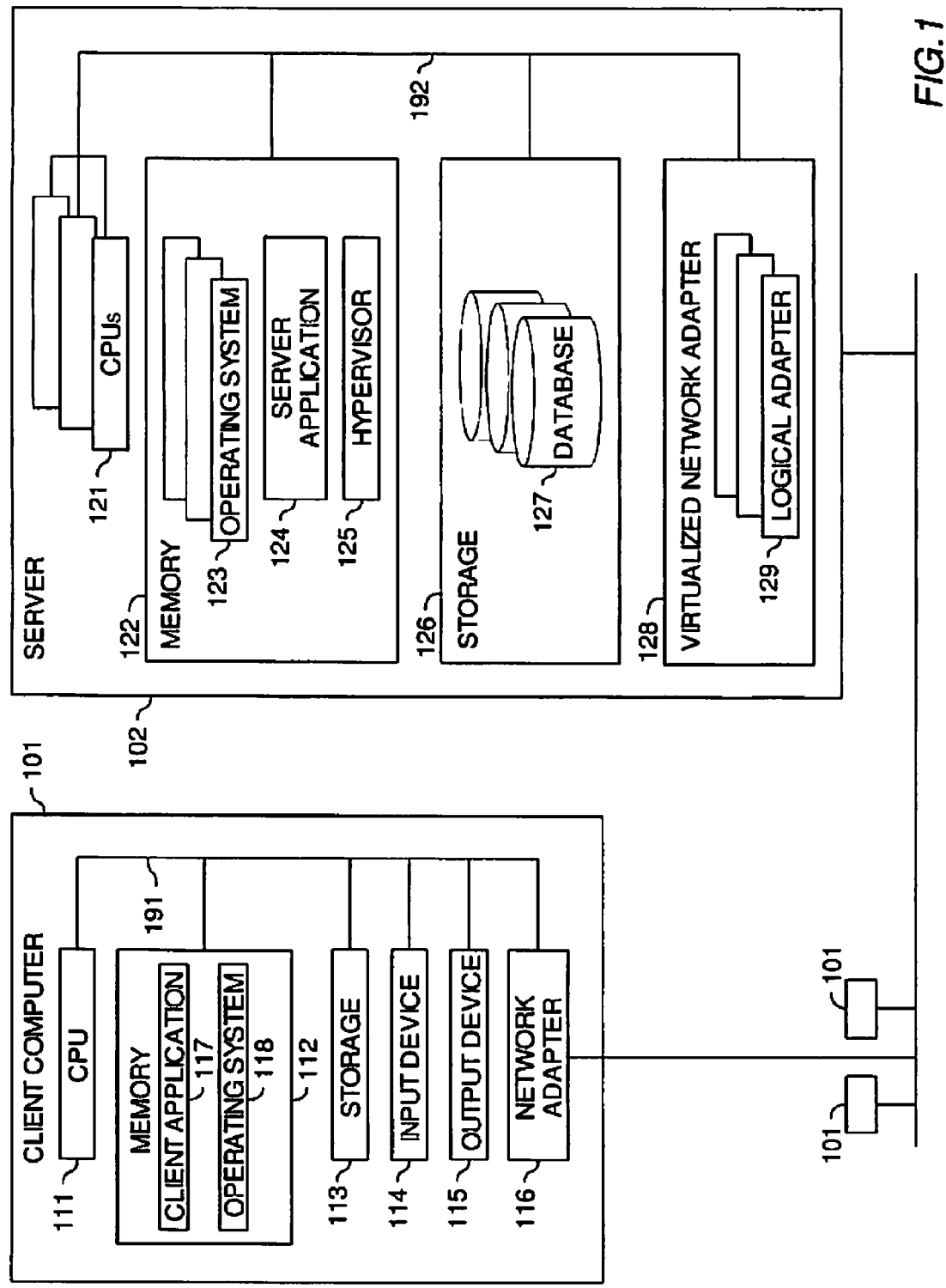
FIG. 1 is an illustration of an exemplary system according to an embodiment of the invention.

Embodiments of the invention generally provide methods and systems for dynamically acquiring MAC addresses in a virtualized Ethernet environment. A server may be partitioned into a plurality of logical partitions. Each logical partition may be associated with a logical adapter to provide network access to the partition. A MAC address may be dynamically allocated to a logical adapter from a predefined range of MAC addresses. Furthermore, the MAC addresses may be unique only within a particular subnet; therefore, the same MAC address may be assigned to adapters in different subnets.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system such as, for example, the network environment 100 shown in FIG. 1 and described below. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Exemplary System

FIG. 1 depicts a block diagram of a networked system 100 in which embodiments of the present invention may be implemented. In general, the networked system 100 includes a client (e.g., user's) computer 101 (three such client computers 101 are shown) and at least one server 102. The client computers 101 and server 102 are connected via a network 190. In general, the network 190 may be a local area network (LAN) and/or a wide area network (WAN). In a particular embodiment, the network 140 is the Internet.

The client computer 101 includes a Central Processing Unit (CPU) 111 connected via a bus 191 to a memory 112, storage 113, an input device 114, an output device 115, and a network interface device 116. The input device 114 can be any device to give input to the client computer 101. For example, a keyboard, keypad, light-pen, touch-screen, trackball, or speech recognition unit, audio/video player, and the like could be used. The output device 115 can be any device to give output to the user, e.g., any conventional display screen. Although shown separately from the input device 114, the output device 115 and input device 114 could be combined. For example, a display screen with an integrated touch-screen, a display with an integrated keyboard, or a speech recognition unit combined with a text speech converter could be used.

The network interface device 116 may be any entry/exit device configured to allow network communications between the client computers 101 and server 102 via the network 190. For example, the network interface device 116 may be a network adapter or other network interface card (NIC).

Storage 113 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 112 and storage 113 could be part of one virtual address space spanning multiple primary and secondary storage devices.

The memory 112 is preferably a random access memory sufficiently large to hold the necessary programming and data structures to operate the client computer. While the memory 112 is shown as a single entity, it should be understood that the memory 112 may in fact comprise a plurality of modules, and that the memory 112 may exist at multiple levels, from high speed registers and caches to lower speed but larger DRAM chips.

Illustratively, the memory 112 contains an operating system 117. Illustrative operating systems, which may be used to advantage, include Linux and Microsoft's Windows®. (Linux is a Trademark of Linus Torvalds in the United States, other countries, or both.) More generally, any operating system supporting the functions disclosed herein may be used.

The memory 112 is also shown containing client applications 118. Client applications 118, when executed by the CPU may be configured to communicate with server 102. For example, client applications 118 may include a web browser program that may retrieve contents of a web page from server 102. Examples of browser programs include Microsoft Internet Explorer and Netscape Navigator. Other examples of client applications 118 include email programs configured to retrieve electronic messages from server 102, query programs configured to query one or more databases contained in server 102, and the like. Client applications 118 may include a web-based Graphical User Interface (GUI), which allows the user to display Hyper Text Markup Language (HTML) information. More generally, however, client applications 118 may be GUI-based programs capable of rendering the information transferred between the client computer 101 and the server 102.

The server 102 may be physically arranged in a manner similar to the client computer 101. Accordingly, the server 102 is shown generally comprising a one or more CPUs 121, a memory 122, a storage device 126, and a virtualized network adapter 128 coupled to one another by a bus 192. Memory 122 may be a random access memory sufficiently large to hold the necessary programming and data structures of the invention.

The server 102 is generally under the control of one or more operating systems 123 shown residing in memory 122. Examples of the operating system 123 include IBM i5/OS®, UNIX, Microsoft Windows®, and the like. More generally, any operating system capable of supporting the functions described herein may be used. Operating systems 123 may include multiple instances of the same operating system, or alternatively, different operating systems.

Memory 122 further includes one or more server applications 124. Server applications 124 are software products comprising a plurality of instructions that are resident at various times in various memory and storage devices in computer system 100. Applications 124 may contain one or more programs to service a request from client computer 101. For example, server applications 124 (and more generally, any requesting entity, including the operating systems 123) may be configured to issue queries against a databases 127 (shown in storage 126) in response to a receiving a query from a client 101 or other server.

Databases 127 are representative of any collection of data regardless of the particular physical representation. By way of illustration, the database 127 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

Server 102 may be a logically partitioned server, thereby allowing server 102 to run as two or more independent servers. The resources of the server may be divided into subsets called logical partitions. For example, CPUs 121, memory 122, applications 124, databases 127, IO devices, etc. may be divided and assigned to one or more specific partitions. In some embodiments, however, one or more server resources may be shared between the partitions. For example, the partitions may share an input port or a section of memory.

Each partition may generally be under the control of one of the operating systems 123. For example, a first partition may be controlled by an IBM i5/OS® operating system, a second partition by a UNIX operating system, a third partition by a Microsoft Windows® operating system, and so on. However, one skilled in the art will recognize that multiple instances of the same operating system may be run on the server, wherein each instance controls a respective partition of the server. For example, the first partition and the second partition may each be controlled by one of two instances of the UNIX operating system.

The following example illustrates the partitioning of a server 102. Server 102 may contain ten CPUs (CPU1, CPU2 . . . CPU10), ten operating systems (OS1, OS2 . . . OS10), ten applications (APP1, APP2 . . . APP10), and ten databases (DB1, DB2. . . DB10). During partitioning CPU1 and DB1 may be assigned to a first partition (Partition1). Partition 1 may be under the control of OS1 and configured to run APP1. Similarly, a second partition (Partition2) may be assigned CPU2 and DB2, controlled by OS2, and configured to run APP2, and so on.

The partitions may be dynamically created during operation of the server. For example, server 102 may receive a request from a client 101 to use an application 124. In response to the request from the client, a partition may be created and resources of the server allocated to the partition to run the application. Furthermore, embodiments of the invention are not limited by the number of partitions. Accordingly, the server may be divided into any reasonable number of partitions.

Virtualized network (Ethernet) adapter 128 may allow communication between server 102 and clients 101, or other servers over network 190. Each virtualized network adapter 128 may have a unique MAC address permanently burned into the adapter. Virtualized network adapter 128 may provide a plurality of logical adapters 129, each logical adapter providing a network connection for a given partition. Logical adapters 129 may be assigned a MAC address from a predetermined set of available MAC addresses. Virtualized network adapter 128 may generally be under the control of hypervisor program 125 shown in memory 122. Furthermore, while one virtualized network adapter 128 is shown in FIG. 1, one skilled in the art will nevertheless recognize that a plurality of virtualized network adapters 128 may be included in server 102.

Hypervisor program 125 generally manages the logical partitions of server 102. The hypervisor program may run in the background during operation of server 102 to manage one or more partitions and prevent server failure. For example, hypervisor 125 may prevent partitions from accessing each others resources and corrupting each others data. Management functions of the hypervisor may also include creating partitions, allocating server resources to partitions, allocating virtual adapters to a partition, allocating a MAC address to a virtual adapter from the predefined set of MAC addresses, and the like.

Mac Address Allocation

Embodiments of the invention provide a logical adapter to each partition of a server 102. When a partition is created, a virtual adapter is provided to the partition, thereby providing the partition access to the network. Each virtual adapter may also be assigned a MAC address. A MAC address is a unique identifier that identifies a device connected to a network, for example network 190.

A predefined range of MAC addresses that may be shared by a plurality of logical adapters. As described earlier, each virtualized Ethernet adapter 128 may contain a unique permanent address. The unique permanent address may be used to communicate with other peer virtualized Ethernet adapters to acquire a MAC address for a logical adapter from the predefined range.

In one embodiment of the invention, the MAC addresses may be unique within a particular subnet. A subnet, or sub-network, may be a division of a larger network. For example, a network may consist of a plurality of Local Area Networks (LAN) connected via the internet. Each LAN may be a subnet of the network. One skilled in the art will recognize that any reasonable criteria may be used to define a subnet from a larger network. For example, a business may own a plurality of devices connected to a network. The business network may be divided into a plurality of subnets. The subnets may be divided based on the business locations, departments, and the like.

Figure 2:
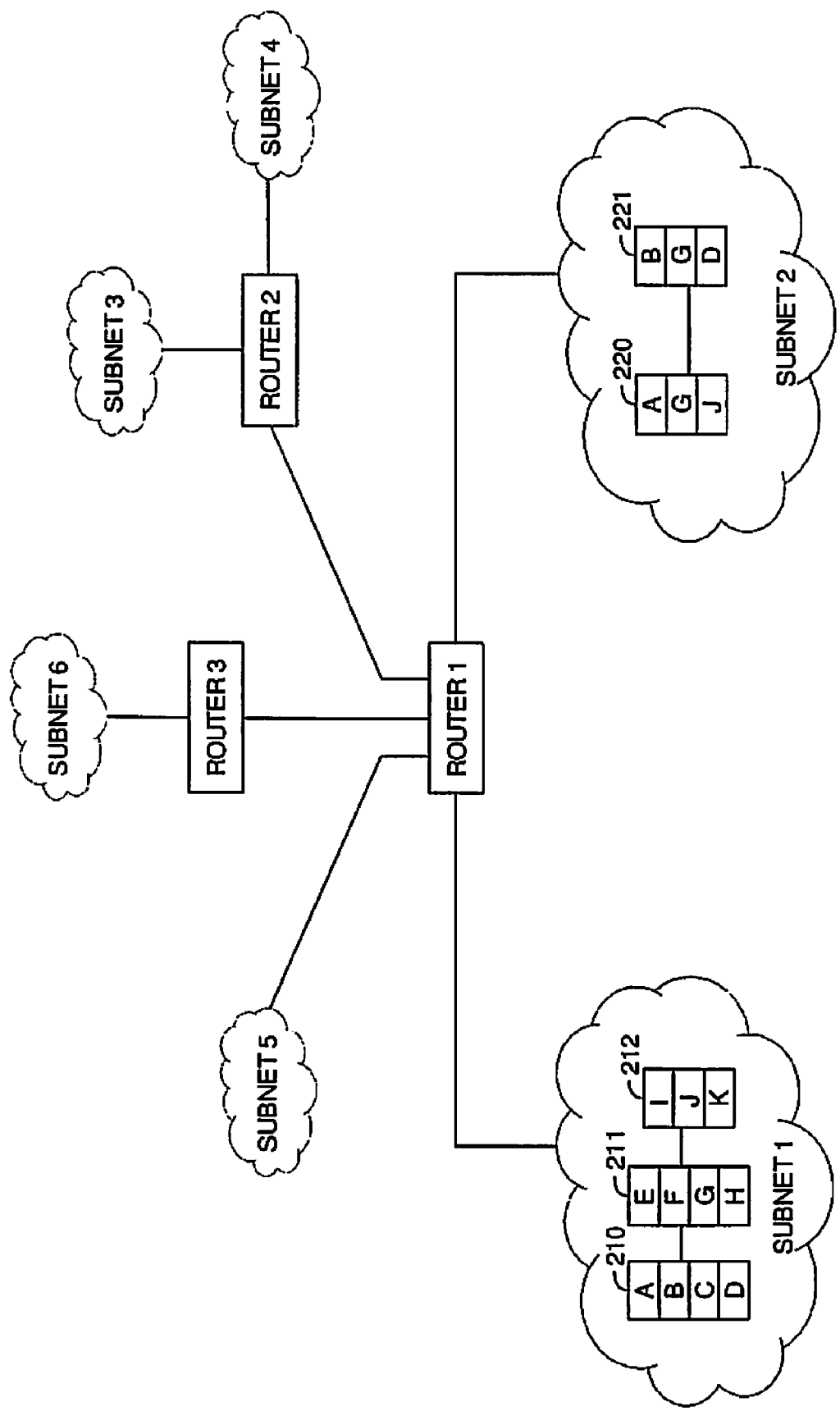
FIG. 2 is an illustration of an exemplary network comprising a plurality of subnets according to an embodiment of the invention.

FIG. 2 illustrates an exemplary network 200 consisting of a plurality of subnets. The subnets may be connected to each other by means of one or more routers. For example, routers 1, 2, and 3 are shown connecting the subnets of network 200. One skilled in the art will recognize that because the subnets are separated by routers, the MAC addresses may only be required to be unique within a given subnet. This is because any data traffic addressed to a device outside a subnet is targeted to the MAC address of the router rather than the another device in another subnet with the same MAC address. Furthermore, the subnet address may be utilized to distinguish between two devices with the same MAC address.

Accordingly, devices in different subnets are shown having the same MAC address in FIG. 2. For example, subnet 1 contains devices 210, 211, and 212. As illustrated, device 210 is divided into four partitions. Each partition is assigned a MAC address represented by an alphabet. For example, the partitions of device 210 have been assigned MAC addresses A, B, C, and D. Similarly, partitions in device 211 have been assigned MAC addresses E, F, G, and H, and partitions in device 212 have been assigned MAC addresses I, J, and K.

As illustrated in FIG. 2, subnet 2 contains devices that have MAC addresses that are also being used in subnet 1. For example, a partition of device 220 of subnet 2 is assigned MAC address A, which is also assigned to device 210 of subnet 1.

By allowing the same MAC address to be assigned to devices in different subnets, embodiments of the invention significantly reduce the total number of MAC addresses that must be purchased to operate the devices on a network. As was previously described, the total number of MAC addresses required by the prior art is the maximum number of logical partitions possible. In contrast, the number of MAC addresses required is only the maximum number of logical partitions on any given subnet, according to embodiments of the invention.

FIG. 3 illustrates the significant reduction in the number of MAC addresses achieved by embodiments of the invention. In Table 300 of FIG. 3, column 310 lists the total number of virtualized Ethernet adapters being used in a network. Column 320 lists the total number of logical adapters that are provided by each virtualized Ethernet adapter in the system. Column 330 lists the total number of partitions that are in use in each subnet of the network.

Column 340 lists the number of MAC addresses that would be required by the prior art. Because a MAC address is required for each possible partition, the number of MAC addresses required is derived by multiplying the total number of adapters in column 310 with the total number of partitions supported by each adapter in column 320. Accordingly, a network represented by the first row of table 300 would require 10,000×256=2,560,000 MAC addresses according to the prior art.

Column 350 lists the number of MAC addresses that may be required by embodiments of the invention. The number of MAC addresses required by embodiments of the invention is determined by the number of partitions that may be used in a particular subnet. However, as described earlier, each virtualized Ethernet adapter requires a permanent MAC address to facilitate communication to acquire MAC addresses for a virtual adapter. Therefore, the total number of MAC addresses required by embodiments of the invention is derived by adding the total number of virtualized Ethernet adapters in column 310 and the total number of partitions that may operate in the subnet in column 330. Accordingly the total number of MAC addresses required by a network represented in the first row is 10,000+100,000=110,000 MAC addresses.

As illustrated in column 360 of table 300, this results in a 95.7% reduction in the total number of MAC addresses required for the network in row 1 in comparison to the prior art. Other rows of table 300 illustrate similar reductions in the number of required MAC addresses achieved by embodiments of the invention in other networks.

Dynamic Access Solution

When a partition is created, hypervisor 125 may allocate a logical adapter to the partition. As part of the allocation of the logical adapter, hypervisor 125 may initiate communication with other virtualized Ethernet adapters within the respective subnet to acquire a MAC address for the logical adapter. The communications, for example, may ensure that the MAC address acquired is unique within the subnet.

The MAC address selected for acquisition may depend on prior usage of the address by a logical adapter provided by the virtualized Ethernet adapter. For example a first MAC address may have been assigned to a first logical adapter. Subsequently the partition may have become inactive and the first MAC address freed up for use by other adapters. If the first logical adapter is reactivated at a later time, hypervisor 125 may attempt to acquire the first MAC address for the first logical adapter. By attempting to acquire the same MAC address each time a partition is initiated, a static configuration of the network may be achieved, thereby reducing communication for MAC address acquisition and network management.

As previously described, each virtualized Ethernet adapter may contain a MAC address permanently burned in the adapter. Therefore, during the communications, hypervisor 125 may send a message to a well known multicast address to indicate a desire to acquire the selected MAC address. The message may be received by other virtualized Ethernet adapters within the subnet. The message may include the permanent MAC address of the virtualized Ethernet adapter that sends the message in addition to the desired MAC address.

Each virtualized Ethernet adapter in a subnet may store data regarding the use of MAC addresses by its logical adapters. For example, the data stored may include the MAC addresses currently in use by its logical adapters, MAC addresses previously used by its logical adapters, and the like. In some embodiments, the data stored may also include MAC addresses that were queried or owned by other virtualized Ethernet adapters.

Therefore, in response to receiving a message from a virtualized Ethernet adapter to acquire a MAC address, one or more virtualized Ethernet adapters in the subnet may respond to the querying virtualized Ethernet adapter based on the data stored in its respective non-volatile memory. One skilled in the art will recognize that only a subset of virtualized Ethernet adapters may provide a response because of the differences that may exist between the data stored in the adapters. For example, one or more virtualized Ethernet adapters in the subnet may not contain any data regarding the MAC address that is being queried. Such virtualized Ethernet adapters may not respond to the message.

Each virtualized Ethernet adapter having data related to the MAC address indicated in the message may respond with a unicast message to the permanent address of the querying virtualized Ethernet adapter. A number of possible responses may be sent by the virtualized adapter. For example, a first type of response may indicate that the MAC address is currently in use by a logical adapter in the virtualized Ethernet adapter. The first type of response may include the identity of the virtualized Ethernet adapter owning the MAC address, for example, the permanent address of the owning virtualized Ethernet adapter.

A second type of response may indicate that the responding virtualized Ethernet adapter contains data which indicates that the MAC address has been announced as being owned by another virtualized Ethernet adapter. The second type of response may include the identity of the virtualized Ethernet adapter owning the MAC address, for example, the permanent address of the owning virtualized Ethernet adapter. The second type of response, for example, may indicate that the MAC address is in use or was recently in use in the subnet.

A third type of response may indicate that there are current or were recent attempts to acquire the MAC address in the subnet. For example, a first virtualized Ethernet adapter may attempt to acquire a MAC address by sending a multicast message to the virtualized Ethernet adapters in the subnet. The virtualized Ethernet adapters of the subnet may update their memories to indicate that the MAC address was queried by the first virtualized Ethernet adapter. Subsequently, a second virtualized Ethernet adapter may attempt to acquire the MAC address by sending a multicast message to the virtualized Ethernet adapters of the subnet. In response to receiving the multicast message from the second virtualized Ethernet adapter, one or more virtualized Ethernet adapters of the subnet may respond to the second virtualized Ethernet adapter with a message indicating that the first virtualized Ethernet adapter is attempting to or has recently attempted to acquire the MAC address.

A fourth type of response may indicate that the MAC address was recently used within a virtualized Ethernet adapter. However, the MAC address may not currently be in use at the adapter. For example, a MAC address may be acquired by a virtual adapter associated with a first virtualized Ethernet adapter. Subsequently, the MAC address may be freed up, for example, because a partition associated with the virtual adapter becomes inactive. If the first virtualized Ethernet adapter receives a message from a second virtualized Ethernet adapter querying the availability of the MAC address, the first virtualized Ethernet adapter may respond to the second virtualized Ethernet adapter with a message indicating that the MAC address was recently in use, but currently inactive in the first virtualized Ethernet adapter.

If a virtualized Ethernet adapter has data indicating more than one possible types of response may be valid, the adapter may respond with any one of the valid responses. For example, the data in a virtualized Ethernet adapter may indicate that the queried MAC address is owned by another adapter indicating a second type of response is appropriate. The data may also indicate that the MAC address was used within the adapter, but that the MAC address is not currently in use indicating a fourth type of response is appropriate. Therefore, the adapter may respond with any one of the two appropriate responses.

Any reasonable criteria may be used to select a response from multiple valid responses. For example, the response based on the most recently updated data may be selected as the response. Alternatively, a priority may be set for each type of response, the response with the highest priority being selected as the response. In one embodiment, the most restrictive response may be used, therefore allowing the requestor to make the best decision.

A virtualized Ethernet adapter attempting to acquire a MAC address may examine all responses received in response to its query regarding a selected MAC address and determine whether the MAC address is available within the subnet. For example, the responses from one or more virtualized Ethernet adapters in the subnet may indicate that the MAC address is not being used. Therefore, the MAC address may be acquired by the querying adapter. In some embodiments, the responses may indicate that that the owning adapter is the querying adapter. For example, during a system restart, the hypervisor may reinitiate all the partitions and adapters. The responses to queries by the adapters may indicate that the querying adapter is the owner of the MAC address, therefore, indicating that the MAC address may be acquired by the adapter.

If a MAC address may be acquired by the querying adapter the adapter may send another multicast message to other virtualized Ethernet adapters in the subnet announcing ownership of the MAC address. In response to receiving the multicast address announcing ownership the virtualized Ethernet adapters of the subnet may update their respective memories to reflect ownership of the MAC address.

In one embodiment, virtualized Ethernet adapters may periodically announce the MAC addresses that are currently being used by the adapter. For example, each virtualized Ethernet adapter may send a multicast message to other virtualized Ethernet adapters indicating the MAC addresses that it is currently using. The receiving virtualized Ethernet adapters may update their memories based on the periodic multicast message, thereby allowing a more informed address selection by the adapters.

If, on the other hand, the responses to a query indicate that the MAC address is not available, the querying virtualized Ethernet adapter may select another MAC address and attempt to acquire the alternative MAC address repeating the same procedure outlined above.

In one embodiment of the invention, the selection of the alternative MAC address may be dependent on a hashing scheme establishing a sequence of MAC addresses. The sequence may establish an order in which the MAC addresses will be attempted to be acquired by the adapters. In one embodiment, a hashing scheme may establish an order of acquisition for each virtualized Ethernet adapter. FIG. 4 illustrates a simple exemplary hashing scheme that may be used to assign an order of acquisition for each virtualized Ethernet adapter.

The hashing scheme may minimize the risk of two or more virtualized Ethernet adapters attempting to acquire the same address. For example, referring to FIG. 4, the hashing scheme ensures a variation in the order of address acquisition between each virtualized Ethernet adapter to reduce the probability of two or more adapters attempting to acquire the same MAC address. Accordingly, as shown in FIG. 4, adapter A is configured to select address 1 in its first attempt to acquire a MAC address, adapter B is configured to select address 10, and adapter C is configured to access adapter 5.

Because the adapters attempt to acquire MAC addresses in a different order, the probability of failure due to two or more virtualized Ethernet adapters trying to acquire the same MAC address are greatly reduced. One skilled in the art will recognize that the simple hashing scheme FIG. 4 is for illustrative purposes only and that the actual hashing scheme that determines which address is selected next may be more advanced than the one illustrated.

In some embodiments, after a MAC address is selected for acquisition, the virtualized Ethernet adapter may examine local memory to determine whether data in local memory indicates the availability of the selected MAC address. If local data indicates that the MAC address is unavailable, attempts to acquire the MAC address may be deferred, and a different MAC address selected. Therefore, attempts to acquire a MAC address that are likely to fail may be avoided. The deferred MAC address may be selected again at a later time if more promising MAC addresses are not found.

Figure 5:
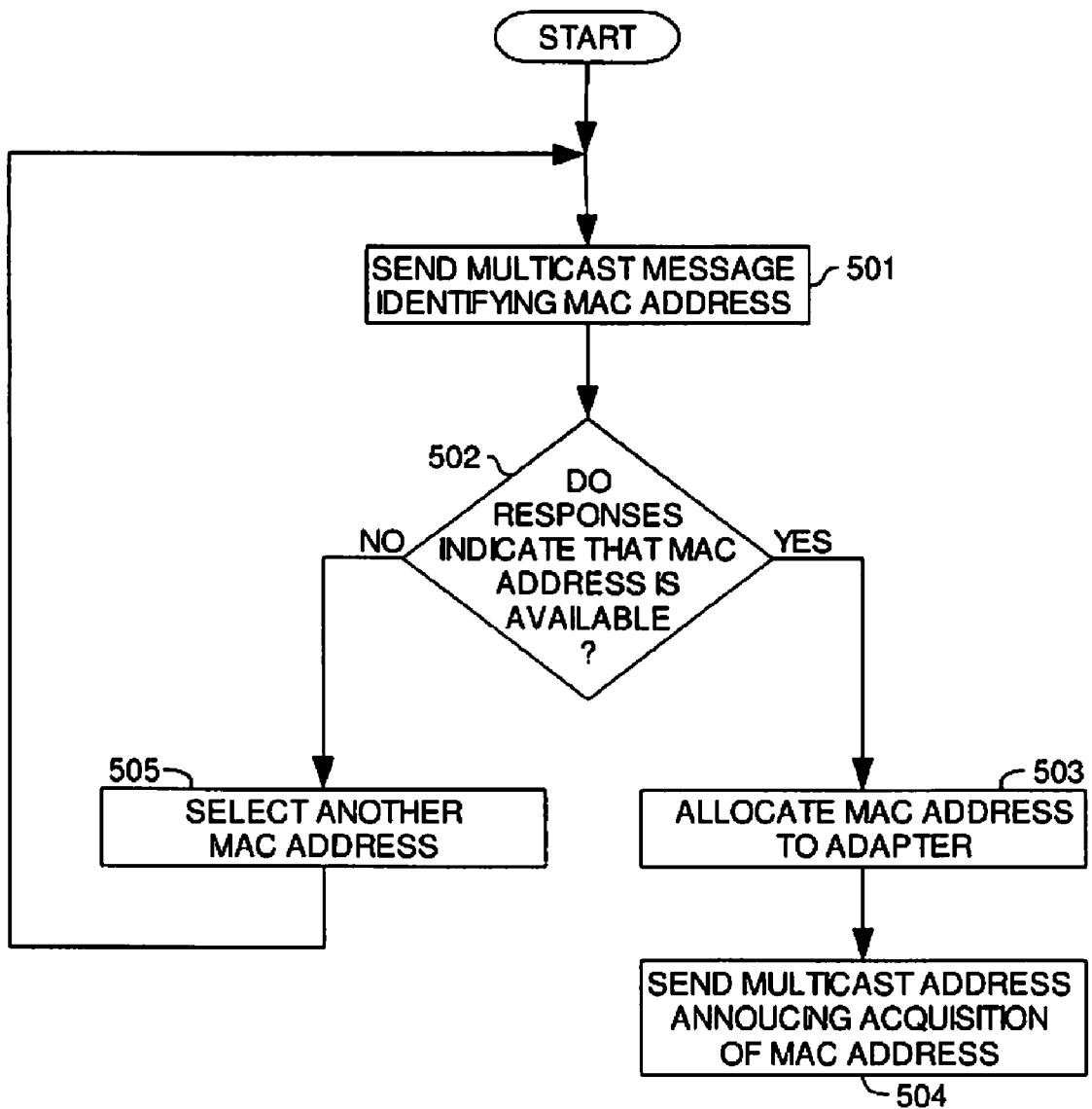
FIG. 5 is a flow diagram of exemplary operation performed by the hypervisor to acquire a MAC address for an adapter.

FIG. 5 is a flow diagram of exemplary operations that may be performed by a hypervisor associated with a virtualized network adapter to acquire a MAC address for a logical adapter. The operations begin in step 501 by sending a multicast message to other virtualized Ethernet adapters in the subnet querying the status of a MAC address previously used by the logical adapter. In step 502, the hypervisor may examine the responses to the message to determine whether the MAC address is available.

If the MAC address is available, in step 503, the hypervisor may allocate the MAC address to the logical adapter. In step 504, the hypervisor may send a multicast message to the virtualized Ethernet adapters of the subnet announcing the acquisition of the MAC address.

If, on the other hand, the responses indicate that the MAC address is unavailable, in step 505, the hypervisor may select another MAC address. The selection of the MAC address, for example, may be performed according to the hashing scheme described above. The above mentioned steps may be repeated with the selected MAC address to determine whether the MAC address is available until an available MAC address is found.

Single Address Server Solution

In one embodiment of the invention a central MAC address server may maintain the status of the shared MAC addresses in a subnet and manage allocation of the MAC addresses to the virtualized Ethernet adapters. For example, referring back to FIG. 2, server 211 may be a central MAC address server for subnet 1. Accordingly, server 211 may be configured to maintain the status of shared MAC addresses, and allocate the MAC addresses to other servers within subnet 1. For example, the central MAC address server may store data indicating the availability of MAC addresses and the virtualized Ethernet adapters to which the MAC addresses in use are assigned. Therefore, the virtualized Ethernet adapters in a subnet may communicate with the central MAC address server to acquire a MAC address.

The central MAC address server may receive multicast messages sent by a virtualized Ethernet adapter attempting to acquire a MAC address. The central MAC address server may be resident on any node within the subnet containing the requesting virtualized Ethernet adapter. In one embodiment, the central MAC address server may be contained within the hardware management control (HMC) used to manage one or more systems. The central MAC address server may determine the allocation of MAC addresses to requesting virtualized Ethernet adapters.

Figure 6:
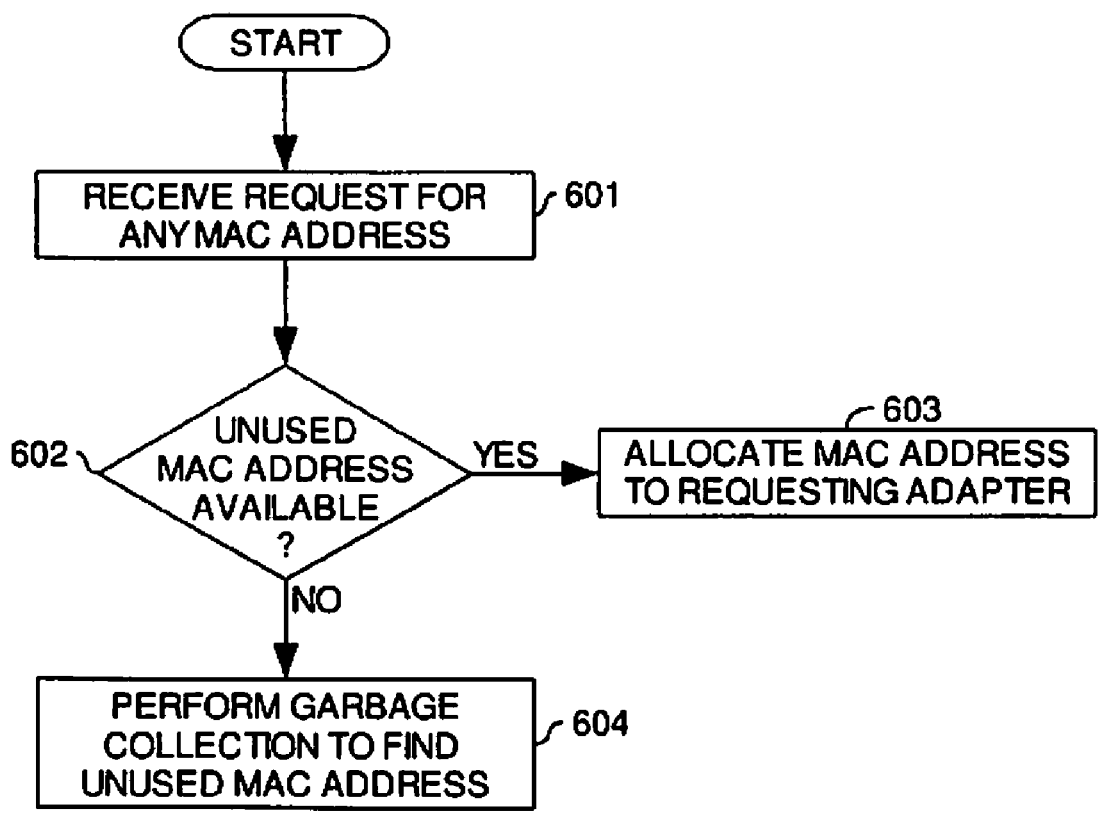
FIG. 6 is a flow diagram of exemplary operations performed by a central MAC address server to allocate an unspecified MAC address to a requesting adapter.

In one embodiment, the multicast message received by the centralized MAC address server may not specify a preferred MAC address. In response to receiving a request for a MAC address without a specific preferred MAC address, the central MAC address server may perform the operations outlined in FIG. 6. The operations may begin in step 601 by receiving the request. In response to receiving the request, in step 602, the central MAC address server may determine whether any unused MAC addresses are available for allocation. If an unused MAC address is found, the MAC address may be allocated to the requesting virtualized Ethernet adapter in step 603. However, if no available MAC addresses are found in step 602, in step 604, the central MAC address server may perform garbage collection operations on the MAC addresses.

Garbage collection may involve selecting a MAC address to determine whether it is no longer used by a virtualized Ethernet adapter. The MAC addresses may be selected randomly, or by any other reasonable means, for example, using the hashing scheme described above. During garbage collection the central MAC address server may send a message to the permanent MAC address of the virtualized Ethernet adapter owning the MAC address, requesting status of the MAC address. The virtualized Ethernet adapter may respond to the request by indicating that the MAC address is in use, that the MAC address is desired for future use, or that the MAC address is not desired for future use. The garbage collection operations may be performed on the shared MAC addresses until an unused MAC address, or alternatively, a MAC address that is not desired for future use is found. In one embodiment, of the invention, if a virtualized Ethernet adapter is no longer active in a subnet, all MAC addresses owned by the deactivated virtualized Ethernet adapter become available for allocation by the central MAC address server.

In some embodiments, to reduce the number of requests necessary to find an available MAC address the central MAC address server may be continuously updated with the status of MAC addresses. For example, in one embodiment, each time the usage of a MAC address changes, the virtualized Ethernet adapter owning the MAC address may update the central MAC address server with the change in status. For example, a virtualized Ethernet adapter may notify the central MAC address server if the status of a MAC address changes from in use to no longer desired, or if a MAC address becomes inactive.

In another embodiment, the central MAC address server may regularly send requests for status information to the virtualized Ethernet adapters in the subnet. The message may be a multicast message received by all virtualized Ethernet adapters in the subnet. The virtualized Ethernet adapters in the subnet may respond with the status information for their respective MAC addresses in response to receiving the multicast message. The message requesting status information, for example, may be sent regularly at the end of a predefined period, or alternatively at the occurrence of a predefined event, for example, when a threshold number of MAC addresses are in use. In other embodiments, the central MAC address server may send periodic messages to specific virtualized Ethernet adapters requesting the status of an identified MAC address.

Figure 7:
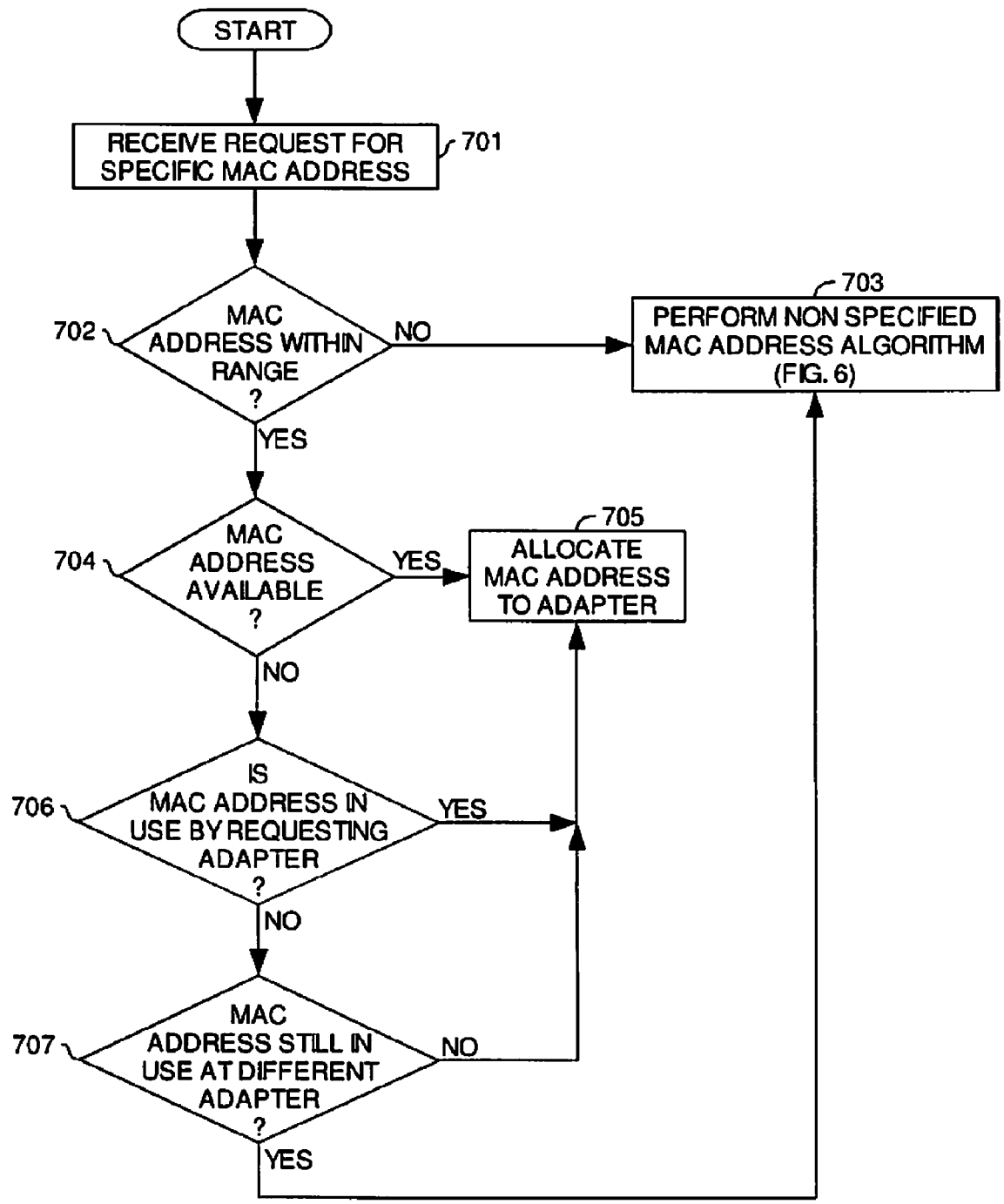
FIG. 7 is a flow diagram of exemplary operations performed by a central MAC address server to allocate a specified MAC address to a requesting adapter.

In one embodiment, the multicast message received by the central MAC address server may specify a desired MAC address. If a MAC address is specified, the central MAC address server may perform the operations outlined in FIG. 7. The operations may begin in step 701 by receiving a multicast message from a virtualized Ethernet adapter requesting a specific MAC address. In step 702, the central MAC address server may determine whether the MAC address is within a range of shared MAC addresses. If the specified MAC address is not within the range of the shared MAC addresses, in step 703, the central MAC address server may perform the non-specified MAC address algorithm outlined in FIG. 6 and allocate an available MAC address other than the specified MAC address.

If the specified MAC address is within the range of the shared MAC addresses, in step 704, the central MAC address server may determine whether the specified MAC address is available. If the specified MAC address is available, the specified MAC address may be allocated to the requesting virtualized Ethernet adapter is step 705. On the other hand, if the MAC address is not available, in step 706, the central MAC address server may determine whether the MAC address is marked as "in use" by the requesting virtualized Ethernet adapter. If the MAC address is marked as in use by the requesting virtualized Ethernet adapter, the MAC address may be allocated to the adapter in step 705.

If, on the other hand, the MAC address is marked as in use by a different virtualized Ethernet adapter, in step 708, the central MAC address server may determine whether the MAC address is still in use by the different virtualized Ethernet adapter. For example, the central MAC address server may send a message to the permanent MAC address of the different virtualized Ethernet adapter owning the MAC address, requesting status of the MAC address. The virtualized Ethernet adapter may respond to the request by indicating that the MAC address is in use, that the MAC address is desired for future use, or that the MAC address is not desired for future use.

If the different virtualized Ethernet adapter response indicates that the MAC address is available, i.e. that the MAC address is not desired for future use, the MAC address may be allocated to the requesting virtualized Ethernet adapter in step 705. On the other hand, if the different virtualized Ethernet adapter response indicates that the MAC address is unavailable, the non-specified MAC address algorithm outlined in FIG. 6 may be performed in step 703 to allocate an available MAC address other than the specified MAC address.

If the central MAC address server needs to be replaced, then the replacement server may need to know the current MAC address allocations. In one embodiment, a copy of the MAC address allocations may be transferred from the original server to the replacement server. If copying of data into the replacement server is not possible, in some embodiments, the central MAC address server may send a message to a well known multicast address requesting status information on MAC addresses owned by the virtualized Ethernet adapters. Virtualized Ethernet adapters receiving the multicast message may respond with the status information, thereby providing the replacement server with the necessary data. In some embodiments, the replacement central MAC address server may defer any requests for MAC addresses until a response from all virtualized Ethernet adapters is received to prevent allocation of the same MAC address to two different virtualized Ethernet adapters.

Because all communications between the central MAC address server and the virtualized Ethernet adapters are addressed to a multicast address and not a permanent MAC address of the central MAC address server, the replacement of the central MAC address server can be performed in a manner that is transparent to the virtualized Ethernet adapters in a subnet.

Multiple Address Server Solution

In one embodiment, to prevent the central MAC address server from becoming a point of failure, multiple central MAC address servers may be employed. In such embodiments, the shared address range may be divided between the servers, each server providing MAC addresses from its respective range. One skilled in the art will recognize that multiple central MAC address servers may be implemented wherein the servers have one or more MAC addresses in common or a partially overlapping shared address range for which the server is responsible.

With multiple central MAC address servers providing MAC addresses, a requesting virtualized Ethernet adapter may be allocated multiple MAC addresses upon request from the central MAC address servers. Therefore, the virtualized Ethernet adapter may select any one of the MAC addresses received. The virtualized Ethernet adapter may notify the central MAC address servers about the selected MAC address.

In some embodiments, a central MAC address server may be dynamically created. Central MAC address servers may be created at any time or in response to a predetermined event or condition. For example, central MAC address servers may be created to provide additional redundancy, in preparation to remove another central MAC address server, to increase the size of available MAC addresses, and the like.

In one embodiment, the multiple MAC address servers may include a master server and one or more standby servers. For example, referring back to FIG. 2, server 211 may be a master server and server 212 may be a standby server. Accordingly, server 211 may maintain the status of shared MAC addresses available to the subnet and manage allocation of the MAC addresses. Server 211 may also be configured to update standby server 212 with the status information. In case of failure at a master server 211, standby server 212 may step in as the master server and manage allocation of the MAC addresses.

When a new central MAC address server is activated it may attempt to find other servers via a query sent to a well known multicast address. If an existing master address server is found, then the new central MAC address server may become a standby address server. The master address server may update the standby server with the current configuration information through an exchange of one or more messages. The messages may include the range of shared MAC addresses that are currently being used. If the ranges only partially overlap, then each address server may update its capabilities to include all ranges. A new address server may become the master server if no other MAC address servers are found.

During normal operation, the master server may update configuration information in each standby server prior to responding to a request from a virtualized Ethernet adapter. The standby servers may be configured to receive a message to a well known multicast address to receive updates from the master server.

In some embodiments, if a request is received from a virtualized Ethernet adapter and the master server is unable to respond, the standby servers may elect a new master server. The newly elected master server may assume the role of the master server and service the request. However, prior to servicing the request, a newly elected master server may retrieve status information as described above.

When a master server allocates a MAC address, it may update the standby servers prior to responding to the virtualized Ethernet adapter. This may be performed, for example, by sending the update data to a first well known multicast address. The first well known multicast address may contain sequencing data so that receiving standby servers may properly update status information in the order in which they were sent. In response to receiving the update data, the standby servers may send a confirmation message back to the master server.

Embodiments of the invention utilize MAC addresses only when necessary, thereby making MAC addresses available to other partitions within the subnet. As described above, the MAC addresses are acquired only when a partition is created. In some embodiments, when a partition becomes inactive, the MAC address may be freed for use by other adapters. Freeing up a MAC address may involve sending a multicast message by the freeing virtualized Ethernet adapter identifying the freed MAC address.

One skilled in the art will recognize that while the term virtualized Ethernet adapter is used herein, embodiments of the invention are not limited to Ethernet adapters. Rather, the invention may be implemented using any type of network adapter.

Conclusion

By providing a predefined range of MAC addresses that may be shared among and dynamically allocated to logical adapters of a network, embodiments of the invention significantly reduce costs associated with acquiring and managing the MAC addresses.

While the foregoing is directed to embodiments of the present invention, other and further embodiments of the invention may be devised without departing from the basic scope thereof, and the scope thereof is determined by the claims that follow.

What is claimed is:

1. A method for dynamically acquiring Media Access Control (MAC) addresses by a virtualized network adapter, comprising:

sending a multicast message requesting MAC address allocation from the virtualized network adapter to one or more central MAC address servers, wherein the one or more central MAC address servers are within a subnet containing the virtualized network adapter; and allocating, by the one or more central MAC address servers, a MAC address from a predefined range of addresses for use by a logical adapter associated with the virtualized network adapter, wherein allocating, by the one or more central MAC address servers, the MAC address from the predefined range of addresses comprises:

determining whether the predefined range of MAC addresses comprises unallocated MAC addresses;

if the predefined range of MAC addresses comprises unallocated MAC addresses, allocating an unallocated MAC address to the virtualized network adapter, and if the predefined range of MAC addresses does not comprise unallocated MAC addresses;

selecting a first MAC address from the predefined range of MAC addresses;

determining whether the first MAC address is in use by the virtualized network adapter to which it is allocated; and allocating the first MAC address to the virtualized network adapter if the first MAC address is not in use and not intended to be used by the virtualized network adapter to which it is allocated.

2. A computer readable storage medium containing a program for dynamically acquiring a MAC address for a virtualized network adapter which, when executed, performs an operation comprising:

sending a multicast message requesting MAC address allocation from the virtualized network adapter to one or more central MAC address servers, wherein the one or more central MAC address servers are within a subnet containing the virtualized network adapter; and allocating, by the one or more central MAC address servers, a MAC address from a predefined range of addresses for use by a logical adapter associated with the virtualized network adapter, wherein allocating, by the one or more central MAC address servers, the MAC address from the predefined range of addresses comprises:

determining whether the predefined range of MAC addresses comprises unallocated MAC addresses;

if the predefined range of MAC addresses comprises unallocated MAC addresses, allocating an unallocated MAC address to the virtualized network adapter, and if the predefined range of MAC addresses does not comprise unallocated MAC addresses;

selecting a first MAC address from the predefined range of MAC addresses;

determining whether the first MAC address is in use by the virtualized network adapter to which it is allocated; and allocating the first MAC address to the virtualized network adapter if the first MAC address is not in use and not intended to be used by the virtualized network adapter to which it is allocated.

3. A system comprising a plurality of computers and one or more central MAC address servers connected to a network, one or more of the computers comprising at least one virtualized network adapter, wherein, to dynamically acquire a MAC address for one of one or more logical adapters associated with the virtualized network adapter, the virtualized network adapter is configured to send a multicast message to one or more central MAC address servers requesting MAC address allocation, wherein the one or more central MAC address servers are within a subnet containing the virtualized network adapter, and the one or more central MAC address servers are configured to allocate a MAC address from a predefined range of addresses for use by the logical adapter associated with the virtualized network adapter, wherein to allocate the MAC address from the predefined range of addresses each central MAC address server is configured to:

determine whether the predefined range of MAC addresses comprises unallocated MAC addresses;

if the predefined range of MAC addresses comprises unallocated MAC addresses, allocate an unallocated MAC address to the virtualized network adapter, and if the predefined range of MAC addresses does not comprise unallocated MAC addresses the central MAC address server is configured to:

select a first MAC address from the predefined range of MAC addresses;

determine whether the first MAC address is in use by the virtualized network adapter to which it is allocated; and allocate the first MAC address to the virtualized network adapter if the first MAC address is not in use and not intended to be used by the virtualized network adapter to which it is allocated.

\* \* \* \* \*